United States Patent
Cucchi

(10) Patent No.: US 12,100,535 B2
(45) Date of Patent: Sep. 24, 2024

(54) SYSTEM AND METHOD FOR IDENTIFICATION AND MARKING OF ELECTRIC CABLES IN INDUSTRIAL CABINETS

(71) Applicant: M-PIX SRL, Gallarate (IT)

(72) Inventor: Maurizio Cucchi, Leggiuno Varese (IT)

(73) Assignee: M-PIX SRL, Gallarate (IT)

( * ) Notice: Subject to any disclaimer, the term of this patent is extended or adjusted under 35 U.S.C. 154(b) by 200 days.

(21) Appl. No.: 17/767,146

(22) PCT Filed: Oct. 9, 2020

(86) PCT No.: PCT/EP2020/078415
§ 371 (c)(1),
(2) Date: Apr. 7, 2022

(87) PCT Pub. No.: WO2021/069665
PCT Pub. Date: Apr. 15, 2021

(65) Prior Publication Data
US 2022/0367086 A1    Nov. 17, 2022

(30) Foreign Application Priority Data
Oct. 10, 2019   (IT) ................. 102019000018440

(51) Int. Cl.
*H01R 13/64* (2006.01)
*G06K 7/10* (2006.01)
(Continued)

(52) U.S. Cl.
CPC ......... *H01B 7/368* (2013.01); *G06K 7/10386* (2013.01); *G06K 7/1417* (2013.01);
(Continued)

(58) Field of Classification Search
CPC ........ B41N 5/267; B41N 5/24; G02B 6/3895; G02B 6/4482; G02B 6/562
See application file for complete search history.

(56) References Cited

U.S. PATENT DOCUMENTS

| | | | |
|---|---|---|---|
| 7,194,829 B2* | 3/2007 | Boire | G09F 3/205 40/666 |
| 7,568,936 B2* | 8/2009 | Shigemi | H01R 43/28 439/374 |

(Continued)

FOREIGN PATENT DOCUMENTS

| | | |
|---|---|---|
| CN | 109427450 A | 3/2019 |
| EP | 3007110 A1 | 4/2016 |
| JP | S61283972 A | 12/1986 |

OTHER PUBLICATIONS

Written Opinion of the International Searching Authority dated Jan. 26, 2021.

*Primary Examiner* — Shin H Kim
(74) *Attorney, Agent, or Firm* — Jacob M. Ward; Ward Law Office LLC

(57) ABSTRACT

Devices for identification and marking of electrical cables and apparatuses in an industrial cabinet include a plate on which is present a bidimensional code, wherein the code presents a possible number of combinations equal to at least $10^6$. A system for the identification and marking of electric cable in industrial cabinets includes a set of devices; an apparatus capable of reading the bidimensional codes; and a processor capable of exchanging data with the reading apparatus, and wherein the electrical scheme of the industrial cabinet is charged. A method for identification and marking of electrical cables and apparatuses in an industrial cabinet making use of the above defined system includes installing a device a cable apparatus reading the bidimensional code using the reading apparatus; associating the (Continued)

bidimensional code to an alpha-numeric code defined in the electrical scheme.

1 Claim, 2 Drawing Sheets

(51) Int. Cl.
*G06K 7/14* (2006.01)
*G06K 19/06* (2006.01)
*G09F 3/00* (2006.01)
*G09F 3/10* (2006.01)
*H01B 7/36* (2006.01)

(52) U.S. Cl.
CPC ..... *G06K 19/06037* (2013.01); *G09F 3/0295* (2013.01); *G09F 3/0297* (2013.01)

(56) References Cited

U.S. PATENT DOCUMENTS

| | | | | |
|---|---|---|---|---|
| 7,849,620 | B2* | 12/2010 | Hussey | G09F 3/005 |
| | | | | 40/633 |
| 7,920,764 | B2* | 4/2011 | Kewitsch | G02B 6/562 |
| | | | | 398/115 |
| 8,595,963 | B2* | 12/2013 | Olivarez | G09F 3/0295 |
| | | | | 40/316 |
| 8,963,869 | B2* | 2/2015 | Hicks | G06F 21/36 |
| | | | | 345/173 |
| 9,201,523 | B1* | 12/2015 | Hwang | G06F 3/0346 |
| 9,785,259 | B2* | 10/2017 | Cueto | G06F 3/03545 |
| 11,626,036 | B2* | 4/2023 | Caveney | G09F 3/02 |
| | | | | 156/187 |
| 2009/0000832 | A1* | 1/2009 | Marggraff | G06Q 10/107 |
| | | | | 178/19.01 |
| 2009/0021493 | A1* | 1/2009 | Marggraff | G06F 3/0483 |
| | | | | 345/179 |
| 2009/0251336 | A1* | 10/2009 | Marggraff | G11B 25/00 |
| | | | | 341/20 |
| 2009/0251337 | A1* | 10/2009 | Marggraff | G06F 3/03545 |
| | | | | 341/20 |
| 2009/0251441 | A1* | 10/2009 | Edgecomb | G06F 3/0321 |
| | | | | 715/863 |
| 2009/0261169 | A1* | 10/2009 | Van Schaack | G06F 3/03545 |
| | | | | 235/494 |
| 2013/0201162 | A1* | 8/2013 | Cavilia | G06F 3/03545 |
| | | | | 345/179 |
| 2014/0347328 | A1* | 11/2014 | Edgecomb | G06F 3/04842 |
| | | | | 345/179 |
| 2015/0324792 | A1* | 11/2015 | Guise | G06Q 20/204 |
| | | | | 705/17 |
| 2017/0243675 | A1* | 8/2017 | Prange | H01B 13/348 |
| 2023/0162625 | A1* | 5/2023 | Wölfl | G09F 3/205 |
| | | | | 40/316 |
| 2023/0389844 | A1* | 12/2023 | Johnson | G16H 50/20 |

* cited by examiner

SYSTEM AND METHOD FOR IDENTIFICATION AND MARKING OF ELECTRIC CABLES IN INDUSTRIAL CABINETS

CROSS-REFERENCE TO RELATED APPLICATIONS

This patent application is a United States National Stage Patent Application of International Patent Application No. PCT/EP2020/078415, filed Oct. 9, 2020, which in turn claims the benefit of Italian Patent Application No. 102019000018440, filed Oct. 10, 2019. The entire disclosures of the above patent applications are incorporated herein by reference.

TECHNICAL FIELD OF THE INVENTION

The present invention is directed to a method for identification and marking of electrical cables used to connect various electrical and electronic apparatuses to industrial cabinets by using electric cables for industrial purposes.

The invention is also directed to a set of devices (e.g. tubes, collars, tags) to be applied to electric cables and to the apparatuses to be connected by the electric cables, wherein each device is provided with a bidimensional code, and a system comprising the set of devices, a reading device and a processor capable of receiving and transmitting data to and from the reading device.

BACKGROUND OF THE INVENTION

Traditionally, wiring of electric apparatuses to electric cabinets is performed by applying to each cable terminal a tag reporting the identification code present in the electric scheme of the plant. In Italy, following the "Normativa di Identificazione dei Conduttori e Designazione delle Connessioni" (Conductor Identification and Connection Designation Regulations), many cabinet's producers have developed a system of tags and supports which have to be written with various system, such as a simple pen, a plotter, thermal transfer, ink-jet, laser mark.

Normally, a transparent tube is installed on each cable terminal and, following the electric scheme, a plastic tag previously printed with the name of the specific terminal is inserted into a special pocket.

Always within this consolidated assembly philosophy, which remains unchanged for decades, the operator takes care of personalizing all tags and supports he or she needs for identification and marking of one or more electric cabinet(s); the operator then takes care of positioning the personalized tags in the correct position; this operation requires a lot of care and might give rise to possible errors; furthermore, it requires a lot of time and affects the overall cost of the final product. On the side of the electrician, he or she has to cover not only the costs of the consumable, but also technological assets such as, for example, the personalization system (plotter, Ink-jet, laser Marker, etc) and the relative software. Another cost associated with this approach is training for correct use of these devices.

EP 3 007 110 discloses a cable connection verification system comprising: a transmitter configured to transmit an inspection signal to a first terminal of a cable, the cable being configured to connect a first contact on a first terminal block with the first terminal and to connect a second contact on a second terminal block with a second terminal; a receiver configured to receive the inspection signal from the second terminal of the cable; and a tag generator configured to generate a tag containing ID information upon reception of the inspection signal of the receiver.

BRIEF DESCRIPTION OF THE INVENTION

In a first embodiment, the present invention is directed to a set of devices to be applied to electric connections to be identified, which devices are characterized by the presence of a plate which contains a unique bidimensional code. The code presents an extremely high number of possible combinations; in this way, it is very unlikely that the set contains two plates presenting an identical code.

In a second embodiment, the invention is also directed to a system for identification and marking of electrical cables and apparatuses in an industrial cabinet, which system comprises: a set of devices as previously defined; an apparatus capable of reading the bidimensional code of the devices; and a processor capable of exchanging data with the reading apparatus, and in which the electrical scheme of the industrial cabinet is charged.

In a further embodiment, the invention is directed to a method for identification and marking of electrical cables and apparatuses in an industrial cabinet, which method comprises the following steps: install a device as previously defined on a terminal to be connected; read the bidimensional code present on the device by using the reading apparatus; associate the bidimensional code to an alphanumeric code defined in the electrical scheme.

DETAILED DESCRIPTION OF THE INVENTION

Figure 1:
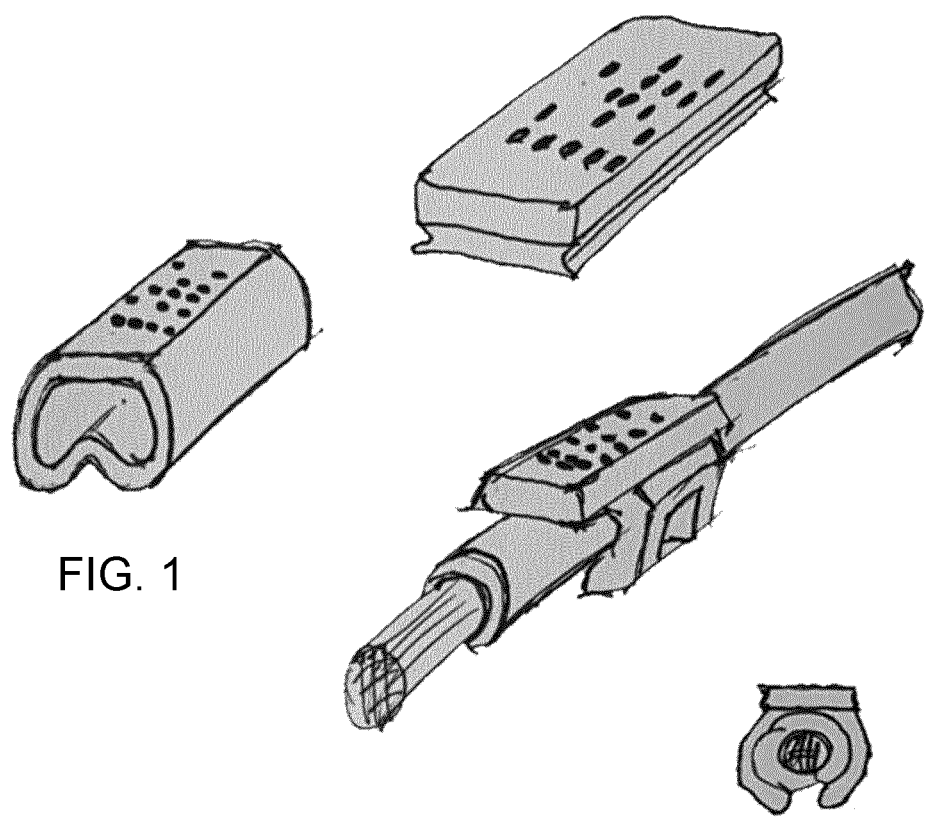
FIG. 1 illustrates various preferred embodiments of a device according to the invention comprising a tube and a plate comprising a bidimensional code.

In a first embodiment, the present invention is directed to a set of devices to be appended to electrical connections which need identification. The devices are characterized by the presence of a plate on which a unique bidimensional code is present. The code presents a very high number of possible combinations such that the probability of having two identical codes in the set is extremely low. The number of possible combinations is preferably equal to or higher than $10^8$, more preferably equal to or higher than $10^{10}$, most preferably equal to or higher than a $10^{12}$.

When comparing the present invention with EP 3 007 110, it is important to note that the prior art method requires printing of a tag after verification of each cable connections. It means that each tag on each terminal contains information which allow identification of the terminal. In the present invention, tags are installed on each terminal before identification of the position of the terminal in the electric scheme. When the system verifies the position of each terminal, then the system associates the unique bidimensional code with the position in the scheme. Thus, the information in the tag is not direct information, but it is a unique code associated by a software to information present in the electric scheme.

The bidimensional code can be, for example, a binary code. An example of binary code is represented by a matrix of black or white dots. Black points can be obtained by printing using well known printing methods, e.g. laser printer, ink-jet printer thermal transfer, print with a laser head. Because of its characteristics of durability, precision and absence of consumable generated by the printing process, laser head printing is a preferred printing method.

The plate can be made of any suitable material, preferably with a material printable by a laser head printer. An example of materials suitable for the manufacture of plates are polymeric and metallic materials.

In a preferred embodiment, the binary code is a bidimensional matrix of i lines and j columns having a number of positions $n=i \times j$ comprised between 20 and 100. Of these positions, an amount comprised between 20% and 80% will be printed, preferably in black or grey, while the remaining 80% to 20% will be left blank. Preferably, the number of printed dots will be comprised between 30% and 70%. As an example, the number of possible combinations C of a matrix composed of 8 lines and 8 columns (n=64 dots) wherein 42 dots are printed (k=42) and 22 are blank is given by the formula: $C=n!/k! \times (n-k)!=64!/42! \times 22!=8.3 \times 10^{16}$. By making use of conventional software for creating random codes, it is possible to print a set of devices (e.g. a set of 1000 devices) having a chance higher than 99% that the set of devices does not contain two identical codes. The set of devices can be sold to the users (e.g. electricians) and the electrician can identify and mark cables and apparatuses of industrial cabinets by using the set of devices.

In any case, n and k are selected in such a way that the possible number of combinations is equal to or higher than $10^6$, preferably equal to or higher than $10^9$, more preferably equal to or higher than $10^{12}$. In fact, when using the method according to the invention, a user will buy a number of plates at least equal to the number of connections to be identified and marked. Thus, it is important that a set of around a thousand plates has a very low probability of containing two identical codes. In any case, in the unlikely event that a set of plates contained two identical codes, the problem would be detected by the processor and the plate containing a code already associated by the processor to a position of the electric scheme, would be discarded.

Thus, by using a bidimensional code having a number of dots comprised between 20 and 100, it is possible to mark with a random code each electric connection to be identified with a very high probability, preferably higher than 99%, that the set of devices does not contain two identical codes. In a preferred embodiment, the number of lines i is comprised between 6 and 12 and the number of columns j is comprised between 5 and 10.

FIG. 1 discloses a preferred embodiment of a device according to the invention, comprising a tube and a plate comprising a bidimensional code. The bidimensional code is preferably of limited size, since space in electric cabinets is rather limited, especially when using reduced-pitch terminal blocks.

Figure 3:
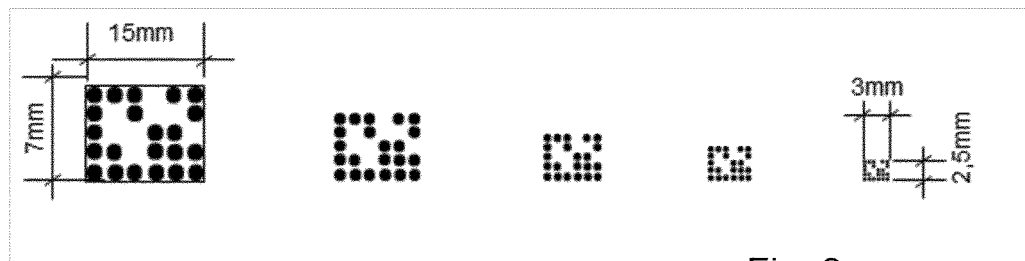
FIG. 3 illustrates a bidimensional code according to the invention in various sizes.

FIG. 3 shows that the bidimensional code can be printed in different formats. The figure shows various sizes starting from 15 mm×7 mm till the smallest 3 mm×2.5 mm. Even in the smallest size, the code maintains a good readability with an optical instrument. Bidimensional codes identifying cable connections are preferably positioned on a plate having a planar face whose size is preferably comprised between 2.5 and 5.0 mm, more preferably about 5.0 mm. Bidimensional codes identifying apparatuses are preferably positioned on a plate having a planar face whose size is preferably comprised between 3.0 and 7.0 mm, more preferably about 5.0 mm.

The device can be affixed in various manner to an electric cable or to an electric/electronic apparatus. In case of an electric cable, the device preferably comprises a tube into which the cable is inserted, and a plate on which the bidimensional code is present. The plate can be connected to the tube either in a fixed manner, or it can be removable. In the latter case, the connection between tube and plate can be performed in various manners, e.g. by a clip. The tube can have a cylindrical shape or a different one, provided it allows insertion of the cable into the tube and fixing thereof.

The device used for identification and marking of electric/electronic apparatuses preferably consists of a plate comprising the bidimensional code, which plate is inserted in a special niche prepared by the manufacturer of the apparatus. Examples of apparatuses to be identified and marked are contactors, fuse holders, power supplies, transformers, etc.

The present invention is also directed to a system for wiring electric cabinets, which system comprises a set of devices, wherein each device comprises a bidimensional code as previously defined; a reading instrument capable of reading the bidimensional codes; a processor which comprises the electric scheme of the cabinet(s) and capable of exchanging information with the reading instrument, more particularly send information to the reading instrument and receiving information from the reading instrument.

As a reading instrument, it is possible to use an instrument which is not specifically designed for the purpose but can be adapted to it, e.g. a smartphone; however, it is preferred the use of an instrument specifically designed for this application The reading instrument comprises a optical reader capable of reading the bidimensional code and a screen.

Figure 2:
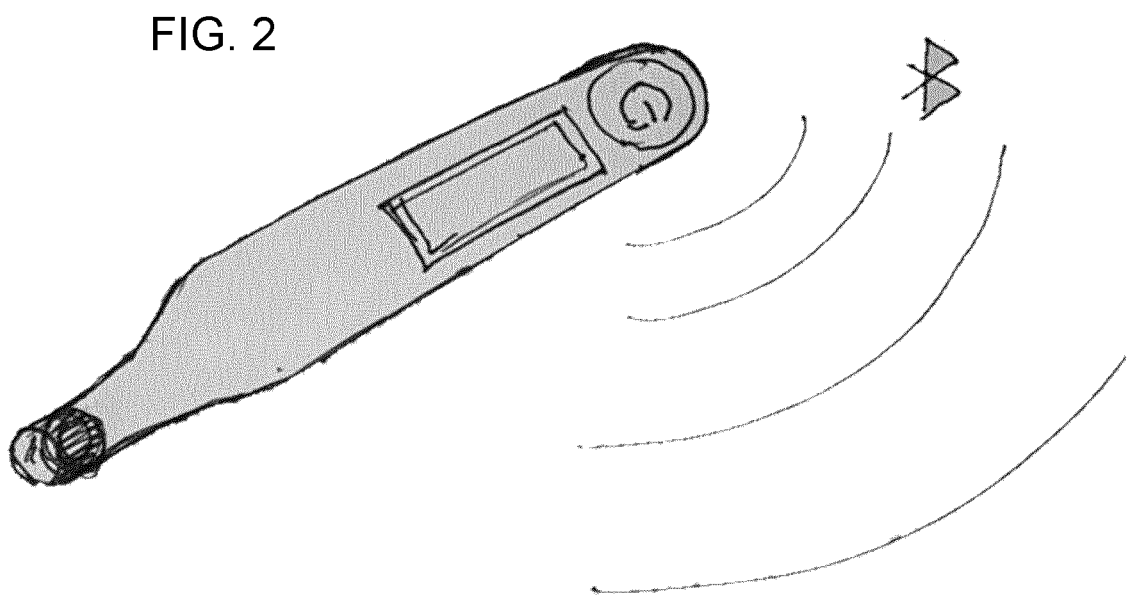
FIG. 2 illustrates a preferred embodiment of a smart pen as a reading device.

FIG. 2 shows a preferred embodiment of the reading instrument: a reading pen (smart-pen) comprising a tip provided of an optical reader capable of reading the bidimensional code of the devices, and a small screen. Preferably, the instrument also comprises a battery, optionally a rechargeable battery, providing electric power supply to the instrument. Preferably the battery is capable of providing power supply for at least 8 hours of use, more preferably at least 12 hours of use. To reduce consumption, and consequently increase duration of the battery, the screen is preferably a low consumption screen making use of e-ink technology as disclosed for example by U.S. Pat. No. 6,120,588 (E-ink Corporation USA)

The reading instrument (e.g. the smart-pen) is connected to a processor, for example a PC, a notebook or a tablet. The connection between reading instrument and PC can be performed in any manner known in the art, e.g. by wire, or wireless. Preferably, the connection is made through the Bluetooth protocol.

The above defined system is used in the method according to the invention for wiring electric cabinet(s).

Figure 4:
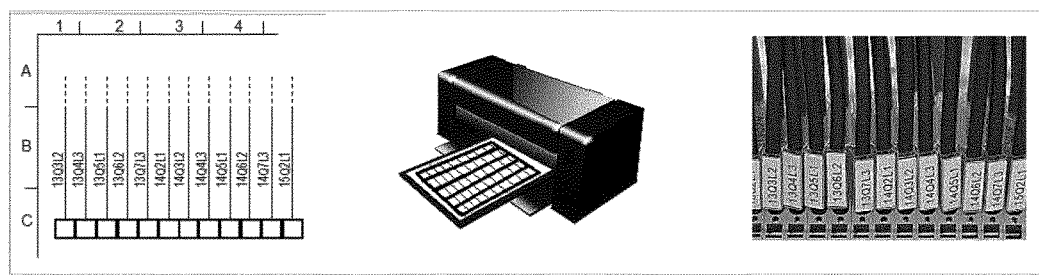
FIG. 4 illustrates the prior art method of identifying and marking electric connections in industrial cabinets.

FIG. 4 shows the elements used in the process of the prior art. On the left side, it is shown a detail of the electric scheme of the project, wherein each position is identified by an alphanumeric code. The operator has to print all codes present in the scheme and then insert the printed code into the specific identification tubes.

Figure 5:
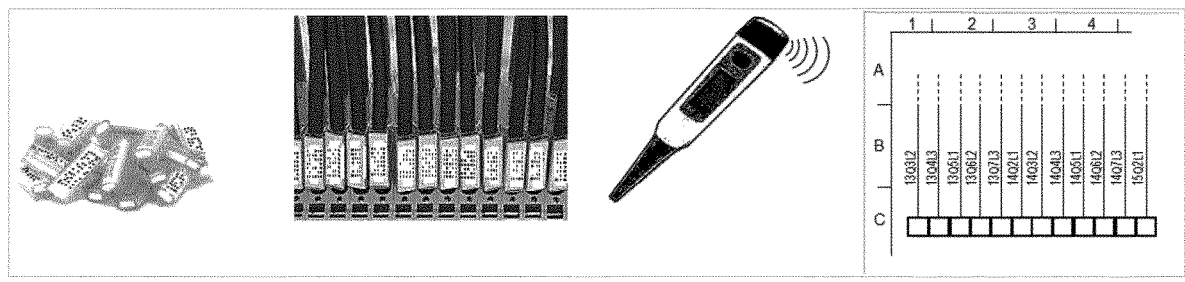
FIG. 5 illustrates the method according to the invention.

Instead, FIG. 5 shows the essential steps of the process of the present invention. On the left, a number of devices pre-printed with a bidimensional code is shown. In the second picture the installed devices are shown. The third figure shows the connection of the bidimensional code with the project code by the reading pen.

Consequently, the method comprises the following steps: 1) installing a device according to the invention on a cable to be wired; 2) reading the bidimensional code present on the device by using a proper instrument, e.g. a reading pen; 3) associating the bidimensional code of the device to the alphanumeric code present in the electric scheme. In step 1) the bidimensional code is randomly selected, e.g. by picking up a device from a set of devices, and the bidimensional code is pre-printed, i.e. it does not contain any information of the position wherein the device is installed. In this way, step 1 is much quicker, when compared to the first step of a conventional process, wherein the code to be installed has to be printed since it contains information of the cable or apparatus to which it is associated.

In a preferred embodiment, step 2) consists of the following sub-steps: after installing the device, the operator selects on the screen of the processor, e.g. by a mouse or a touch screen, a position of the electric scheme corresponding to the position where the cable is wired or to the apparatus to be identified, and t which, in the project, or electric scheme, a code is associated. Then, the operator reads the bidimensional code by using the reading instrument. After reading the code, on the screen of the reading instrument, the project code is visualized. The operator verifies the correctness of the code and validates the association of the bidimensional code with the project code. As a consequence, any future reading of the bidimensional code by the reading instrument, will result in the project code to be visualized by the reading instrument. This fact allows the performance of maintenance operations of the plant (electric cabinet(s) and apparatuses) easily and unequivocally by using the reading instrument and the processor used in the wiring phase.

The invention claimed is:

1. A method for identification and marking of electrical cables and apparatuses in an industrial cabinet making use of a system comprising:
   a. a set of devices wherein each device comprises a plate on which is present a random bidimensional code, wherein the code presents a possible number of combinations equal to at least $10^6$;
   b. an apparatus capable of reading the bidimensional codes of the devices; and
   c. a processor capable of exchanging data with the reading apparatus, and wherein an electrical scheme of the industrial cabinet is charged;
   the method comprising the following steps:
   i. installing one of the devices on a cable or an apparatus to be connected;
   ii. reading the bidimensional code present on the device by using the reading apparatus, including:
      1. selecting on a screen of the processor a point of the cabinet corresponding to the cable that is going to be connected to the cabinet, and to which, in the electrical scheme, corresponds an alphanumeric code;
      2. reading the bidimensional code of the device by the reading apparatus:
   iii. associating the bidimensional code to an alphanumeric code defined in the electrical scheme.

* * * * *